(12) United States Patent
Mehrotra et al.

(10) Patent No.: US 11,327,988 B2
(45) Date of Patent: May 10, 2022

(54) DYNAMICALLY SELF-INDEXING DATABASE-MANAGEMENT SYSTEM

(71) Applicant: INTERNATIONAL BUSINESS MACHINES CORPORATION, Armonk, NY (US)

(72) Inventors: Gaurav Mehrotra, Pune (IN); Nirmal Kumar, Bangalore (IN); Hrishikesh S. Kumar, Bangalore (IN); Pratik P. Paingankar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 16/447,161

(22) Filed: Jun. 20, 2019

(65) Prior Publication Data
US 2020/0401598 A1    Dec. 24, 2020

(51) Int. Cl.
*G06F 16/2458*    (2019.01)
*G06F 16/25*    (2019.01)
(Continued)

(52) U.S. Cl.
CPC .......... *G06F 16/254* (2019.01); *G06F 16/217* (2019.01); *G06F 16/2282* (2019.01); *G06F 16/2458* (2019.01)

(58) Field of Classification Search
CPC .. G06F 16/2282; G06F 16/284; G06F 16/221; G06F 16/217; G06F 16/2246; G06F 16/951; G06F 16/22
(Continued)

(56) References Cited

U.S. PATENT DOCUMENTS 9,672,235 B2    6/2017  Schreter
2002/0120617 A1    8/2002  Yoshiyama
(Continued)

FOREIGN PATENT DOCUMENTS

WO    20171830651 W    10/2017

OTHER PUBLICATIONS

Zhang, Huanchen et al.; Reducing the Storage Overhead of Main-Memory OLTP Databases with Hybrid Indexes; Proceedings of the 2016 International Conference on Management of Data; Jun. 26-Jul. 1, 2016; pp. 1567-1581.

*Primary Examiner* — Robert W Beausoliel, Jr.
*Assistant Examiner* — Pedro J Santos
(74) *Attorney, Agent, or Firm* — Schmeiser, Olsen & Watts; Stephanie Carusillo

(57) ABSTRACT

A dynamically self-indexing database-management system selects database indexes associated with table columns that are most frequently accessed by user queries, deleting all other indexes. The system periodically reviews database-performance figures and data-usage patterns for each table of its database and revises its selection of indexes in order to ensure that only the most frequently accessed columns continue to be indexed and that the omission of other indexes does not degrade performance. The total number of selected indexes, the overall percent of selected indexes, or the selection itself is optimized over time through continued monitoring of database transaction logs. Optimization may comprise cognitive analytics or other methods of artificial intelligence by which the system learns over time how to best determine whether its current selection of indexes is likely to provide the best overall performance.

20 Claims, 4 Drawing Sheets

(51) Int. Cl.
   *G06F 16/21*      (2019.01)
   *G06F 16/22*      (2019.01)
(58) Field of Classification Search
   USPC .......................................... 707/741, 17.002
   See application file for complete search history.

(56) References Cited

U.S. PATENT DOCUMENTS

| | | |
|---|---|---|
| 2014/0278986 A1 | 9/2014 | Rouse |
| 2016/0132502 A1* | 5/2016 | Balasa Ramnath ... G06F 16/284 707/689 |
| 2018/0129691 A1 | 5/2018 | Mathur |

* cited by examiner

DYNAMICALLY SELF-INDEXING DATABASE-MANAGEMENT SYSTEM

BACKGROUND

The present invention relates in general to database-management systems (DBMSs) and in particular to improving the storage efficiency and performance of database indexes.

Relational databases store data in tabular format, where each row, or record, of a table can be subdivided into a set of fields known as columns. Each row stores one set of instances of that table's columns.

Some DBMSs allow users to query data stored in a table by retrieving records that store a specified value of a particular column. This method, however, is relatively inefficient because it requires the database manager to retrieve every row of the table in order to examine values of the particular column stored in each row.

A more efficient query mechanism instead accesses data stored in a table by retrieving a predefined index that identifies values stored in one or more of the table's more commonly accessed columns. A query that searches for records as a function of an indexed column value therefore needs to retrieve only the column values stored in the index, rather than retrieving entire records. Furthermore, an index may be stored as a "B-tree" data structure, which can be searched with greater efficiency than a database table.

SUMMARY

Embodiments of the present invention comprise systems, methods, and computer program products for a dynamically self-indexing database-management system. The self-indexing database-management system selects database indexes that reference the most frequently accessed table columns, deleting all other indexes. The system periodically reviews database-transaction logs of database-performance statistics and data-usage patterns for each table of the database. The system continuously uses this information to revise the selection of indexes such that only the most frequently accessed columns continue to be indexed and that the omission of other indexes does not degrade performance. The total number of selected indexes, the overall percent of selected indexes, or the selection of indexes itself is optimized over time through continued monitoring of the database-transaction logs. Optimization may comprise cognitive analysis by which the system learns to determine whether its current selection of indexes continues to provide the best overall performance.

DETAILED DESCRIPTION

Figure 1:
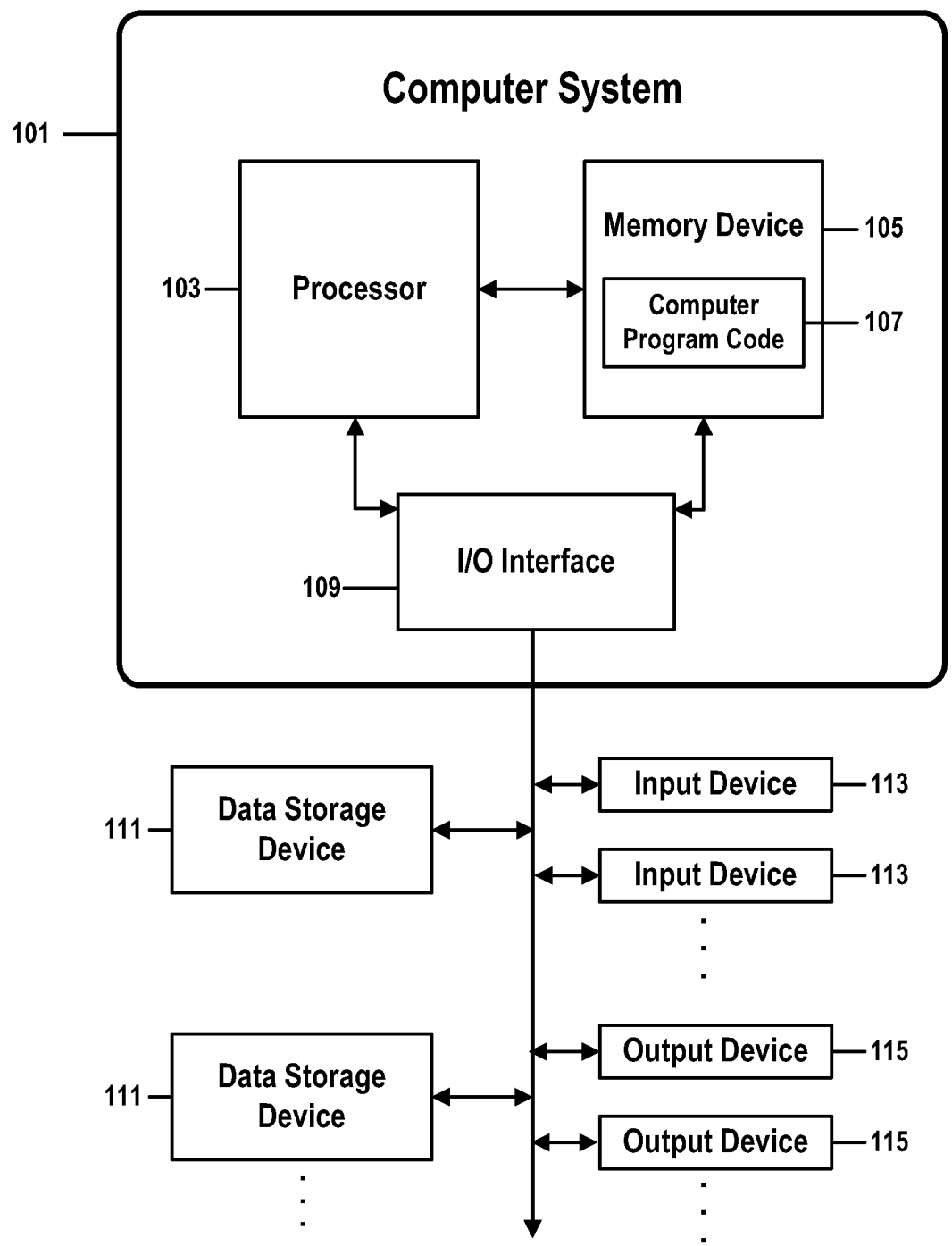
FIG. 1 shows the structure of a computer system and computer program code that may be used to implement a method for a dynamically self-indexing database-management system in accordance with embodiments of the present invention.

Indexing a database table can greatly improve query performance by allowing a database manager to service a query by traversing an index B-tree, rather than being forced to retrieve every record stored in a queried table. Indexed queries, however, can themselves become inefficient when a very large table contains enormous numbers of rows and correspondingly massive indexes.

Embodiments of the present invention provide benefits that address this problem with an improved type of dynamically self-indexing database table. Such tables dramatically reduce the size of a table's indexes by allowing a table to index only a subset of its columns or possible combinations of columns.

The columns selected for indexing are chosen as a function of the frequency with which the index columns are queried. This method is especially efficient when a table's column-query pattern conforms to a long-tail distribution. That is, if a relatively large number of queries are directed to a relatively small subset of a table's columns, it is possible to eliminate a greater number of less-frequently used column indexes without compromising the database's response time to most queries.

For example, consider a database application in which 90% of the application's queries access only 20% of the database tables' columns. Rather than indexing every, or most, columns, a dynamic, self-indexing database system might index only the 20% most-frequently accessed columns. Because the resulting index is only one-fifth as large as it would be in a conventional database, a query can traverse the index's B-Tree much more quickly, providing greatly improved response times for 90% of the application's database queries. Performance would be compromised for queries that access the nonindexed 80% of the database's columns, but in most cases, the great improvement in speed for 90% of the queries outweighs the lowered efficiency of the other 10%.

Smaller indexes provide other benefits, such as reduced complexity, lower storage requirements, and greater scalability. Dynamic indexing, for example, allows a "big data" application like a data warehouse to be implemented on less-expensive platforms that don't need the performance or storage capacity that would be required with a conventional database.

Embodiments of the present invention may automate the implementation of such improved database tables in any manner desired by an implementer. For example, a system could be manually configured to index only a certain percent of the most frequently queried columns, based on logged database statistics or performance measurements. Some embodiments could then automatically perform periodic updates to the index B-trees, based on updated statistics. In some embodiments, the system could further use updated logs or measurements to periodically revise the percent of columns to be indexed.

In all cases, the dynamically indexed database can be configured to respond to changing usage patterns by automatically revising itself to provide an optimal compromise between improved performance for more common types of queries and reduced performance for less common types of queries.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for a dynamically self-indexing database-management system in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for a dynamically self-indexing database-management system in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for a dynamically self-indexing database-management system.

Any of the components of the present invention could be created, integrated, hosted, maintained, deployed, managed, serviced, supported, etc. by a service provider who offers to facilitate a method for a dynamically self-indexing database-management system. Thus the present invention discloses a process for deploying or integrating computing infrastructure, comprising integrating computer-readable code into the computer system 101, wherein the code in combination with the computer system 101 is capable of performing a method for a dynamically self-indexing database-management system.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for a dynamically self-indexing database-management system may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for a dynamically self-indexing database-management system is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
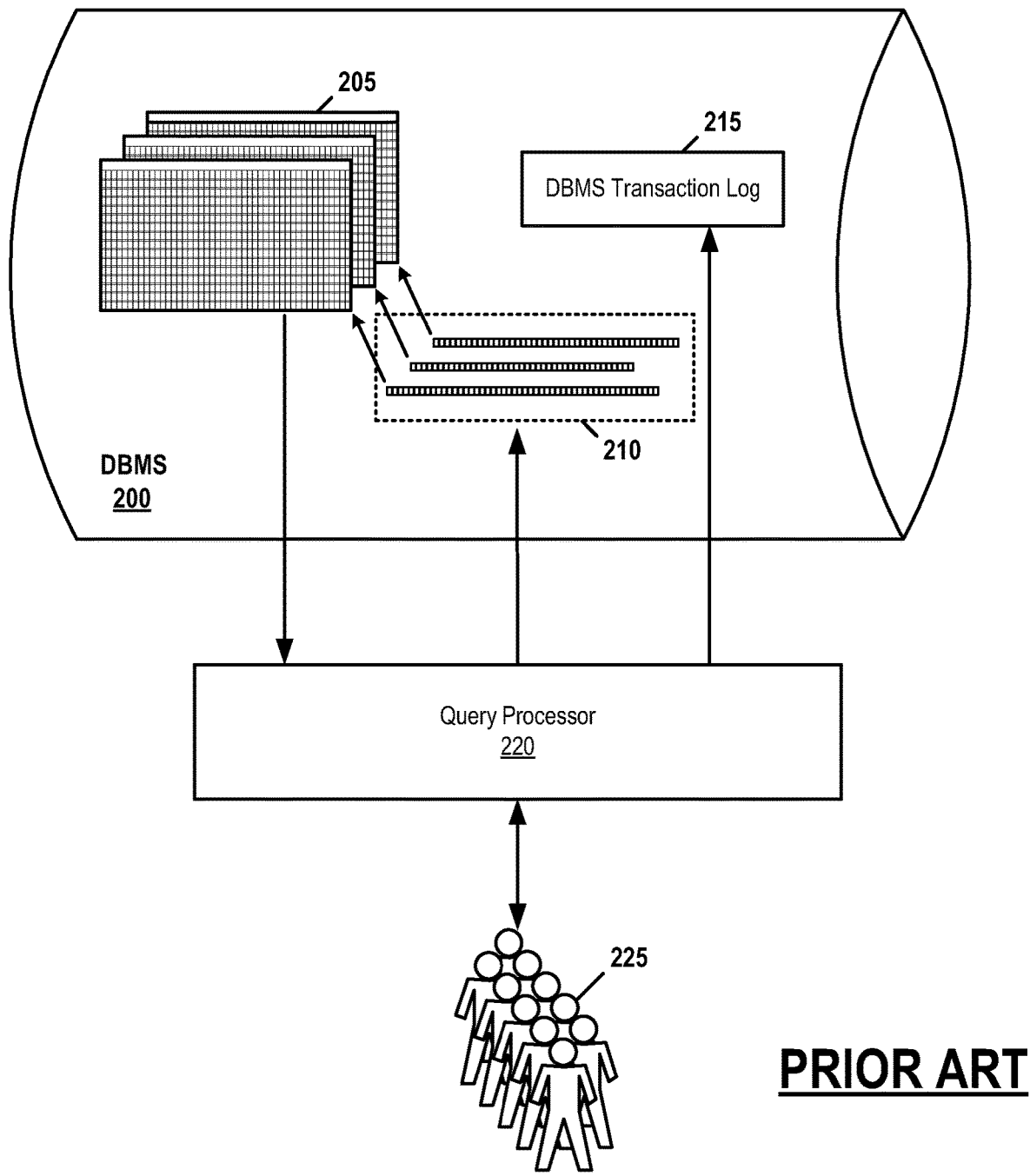
FIG. 2 shows a high-level structure of a conventional database-management system's indexing mechanism.

FIG. 2 shows a high-level structure of a conventional database-management system's indexing mechanism. FIG. 2 shows items 200-225.

A relational DBMS 200 stores data as a set of tables 205 that each organizes records of data into rows and columns. Each table is associated with a particular set of fields or columns and each row of a table contains one instance of each of that table's columns.

For example, a Customer.Info table could be associated with five columns: First.Name, Last.Name, Account.Number, Zip.Code, and Invoice.Balance. Each row of the Customer.Info table would then store these five pieces of information for one customer.

Users 225 access information stored in the tables by submitting a query to a query processor application 220. Query processor 220 responds by retrieving, deleting, updating, or performing other requested operations upon data stored in one or more database tables. Query processor 220, or some other component of DBMS 200, logs characteristics of transactions requested by the query in a transaction log 215. Such characteristics may, for example, include a listing of each table or column accessed by a query, a data-access time or response time associated with the query, or a time and date at which a query was serviced.

It is inefficient to attempt to access data stored in a large table by simply retrieving every row stored in the table one at a time. Modern DBMSs increase efficiency by creating a set of indexes 210 for each table. Each index stores values of one particular column of every row in the table. It is possible for an index to be configured to store values of a combination of columns, but even then, the overall indexing mechanism is similar in all other ways. In the example of FIG. 2, one table of tables 205 can be accessed by a set of 45 distinct indexes of the sets of indexes 210, another table of tables 205 can be accessed by a set of 41 distinct indexes of the sets of indexes 210, and a third table of tables 205 can be accessed by a set of 40 distinct indexes of the sets of indexes 210. Each of these indexes allows a query to efficiently retrieve a row of data from a corresponding table by specifying a value of a specific column of that corresponding table.

Indexing mechanisms improve performance in several ways. Because I/O operations are typically very slow compared to other types of computer functions, performing a distinct read operation for every row of a table can greatly increase a DBMS's response time. Indexes, however, are usually stored as a highly efficient B-tree data structure that takes up relatively little storage. In many cases, an entire index can be retrieved from storage with a single read operation. In addition, it takes far less time to traverse an optimized B-tree than it would to search, field by field, through an entire table of data organized into simple rows and columns.

In one example, a user queries a Customer.Info table 205 in order to retrieve a record of customer information for the customer with account number 12345. An index 210 stores values of the Account.Number field for each row of table 205.

Instead of sequentially retrieving and searching each row of data stored in table 205, the DBMS performs a single I/O operation to retrieve the Customer.Info.Account.Number index 210. This index contains all values of column Account.Number stored in table 210 organized as a B-tree that may be quickly traversed by the DBMS. The DBMS quickly searches the index 210 for an occurrence of the Account.Number value 12345. Once that value is located in the index 210, a corresponding pointer in the index tells the DBMS which record of table 210 to retrieve. The system then retrieves that record and returns to the user the four other stored values associated with customer account 12345.

Figure 3:
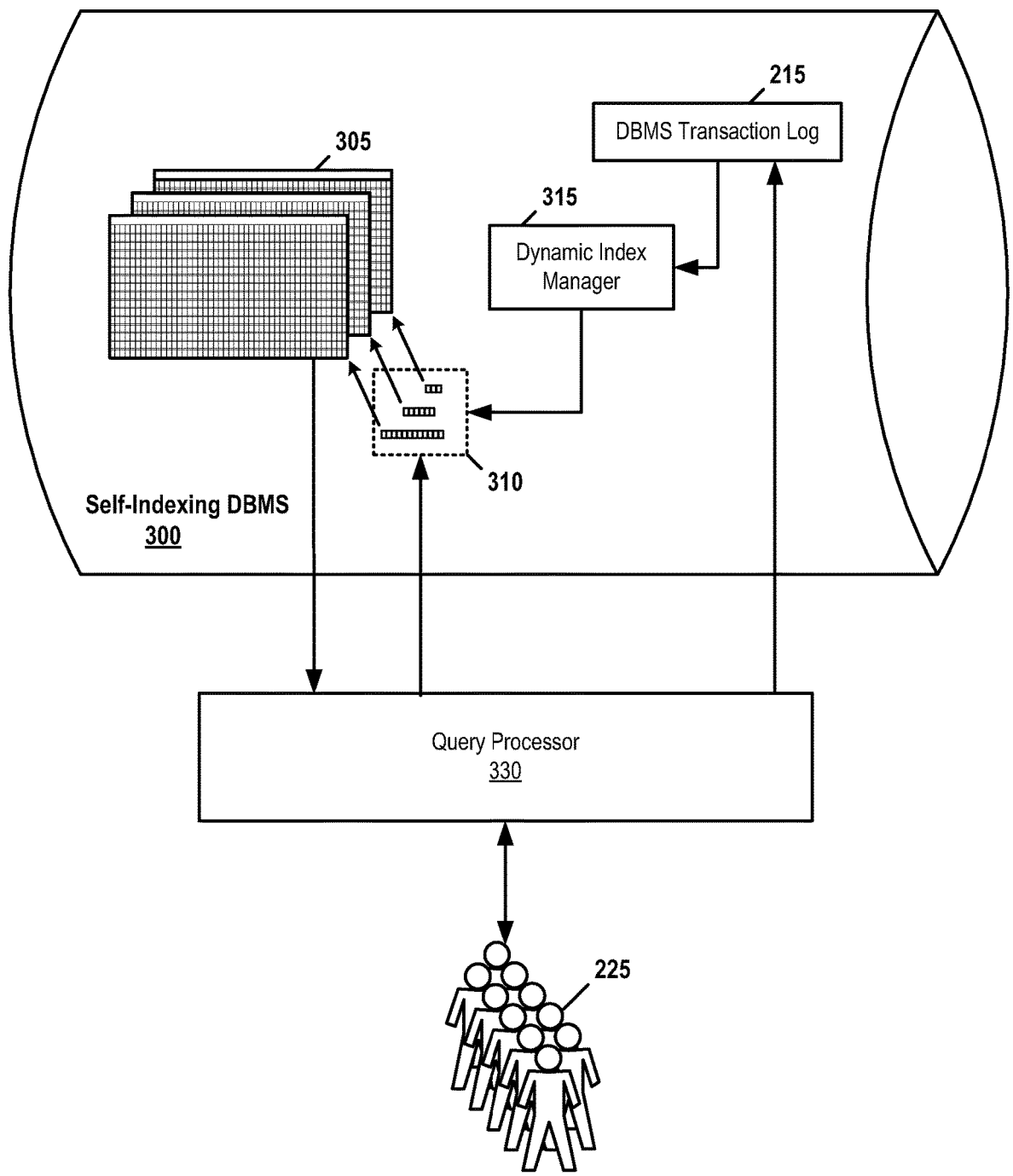
FIG. 3 shows an equivalent high-level structure of a database-management system improved by a dynamically self-indexing mechanism in accordance with embodiments of the present invention.

FIG. 3 shows a high-level structure of an improved database-management system 300 improved by a dynamically self-indexing mechanism in accordance with embodiments of the present invention. FIG. 3 shows items 215, 225, and 300-330. Items 215 and 225 are identical in form and function to similarly numbered items in FIG. 2.

Improved DBMS 300 comprises a dynamic self-indexing mechanism that automatically revises a set of the indexes, of the sets of indexes 310, that corresponds to a corresponding table of the tables 305. This automatic revising is performed as a function of data-usage patterns of the corresponding table. As in FIG. 2, this data-usage information is stored in DBMS transaction log 215 in response to the submission of queries and other transaction requests from users 225.

In the improved system of FIG. 3, when the improved DBMS's 300 query processor 330 receives a query, the query processor 330 accesses data stored in tables 305 by selecting the appropriate table index of indexes 310. Unlike the legacy DBMS 200 of FIG. 2, however, the sets of indexes 310 are only a subset of the total set of indexes 210. Here, a dynamic index manager 315 of DBMS 300 eliminates indexes associated with table columns that are not accessed often enough to satisfy a threshold value selected by an implementer.

For example, FIG. 3's indexes 310, rather than comprising FIG. 2's sets 210 of 45, 41, and 50 indexes for, respectively, the three tables 205, instead comprises only sets 310 of 3, 6, and 12 indexes for those three tables. Here, dynamic index manager 315 has determined that, based on past usage statistics logged into transaction log 215, that the smaller sets of indexes 310 provide efficient access to the most-often queried columns of the three tables.

The present invention is flexible enough to accommodate embodiments that comprise any sort of definition of "most-often queried" desired by an implementer. For example, if an implementer desires to reduce the number of indexes for a particular table by 50%, the user can arbitrarily set a threshold value that eliminates one-half of the indexes previously maintained for that table.

Similarly, if an implementer wishes to improve performance for 90% of user queries, the implementer can set a threshold value that retains indexes required to service 90% of logged queries. The information necessary to set such a determination may be retrieved from transaction records stored in transaction log 215. Such records would show, for example, how often particular columns of particular tables have been accessed by past queries.

In this manner, the improved, dynamically self-indexing database-management system 300, which comprises dynamically self-indexing tables and a dynamic indexing mechanism, can reduce the total number of indexes that must be created and maintained in order to service a majority of queries. This total number can be adjusted at will, according to an implementer's preferences or by means of an automated or cognitive determination generated as a function of historical records stored in transaction log 215.

In some embodiments, the total number is continuously or iteratively adjusted as a function of updates to the transaction log 215 or as a function of recorded DBMS performance statistics, such as average response time needed to service a query. For example, an embodiment could automatically adjust the total number of indexes 315 or select different indexes to be included in the set of indexes 315 by monitoring DBMS performance. If DBMS performance does not achieve an acceptable level, the number of indexes 315 could be automatically or iteratively increased to add certain less-frequently accessed table columns until satisfactory performance is attained. In more nuanced embodiments, the selection of indexes 315 could be revised when data-usage statistics are updated to ensure that the set of columns indexed by indexes 315 continue to consist of data items identified as being most-frequently accessed by the updated logs.

In some embodiments, further efficiencies may be realized by incorporating the dynamic indexes 315 into the bodies of corresponding tables 305. In other embodiments, DBMS 300 may further improve performance by storing indexes 315 in memory. This latter improvement may be made possible by the fact that the dynamic indexes 315 require so much less storage capacity than does a full set of indexes 215. Because accessing data from memory is so much faster than reading data from secondary storage, such an improvement can dramatically increase the performance of an improved DBMS 300 without consuming a prohibitive volume of computer memory.

Figure 4:
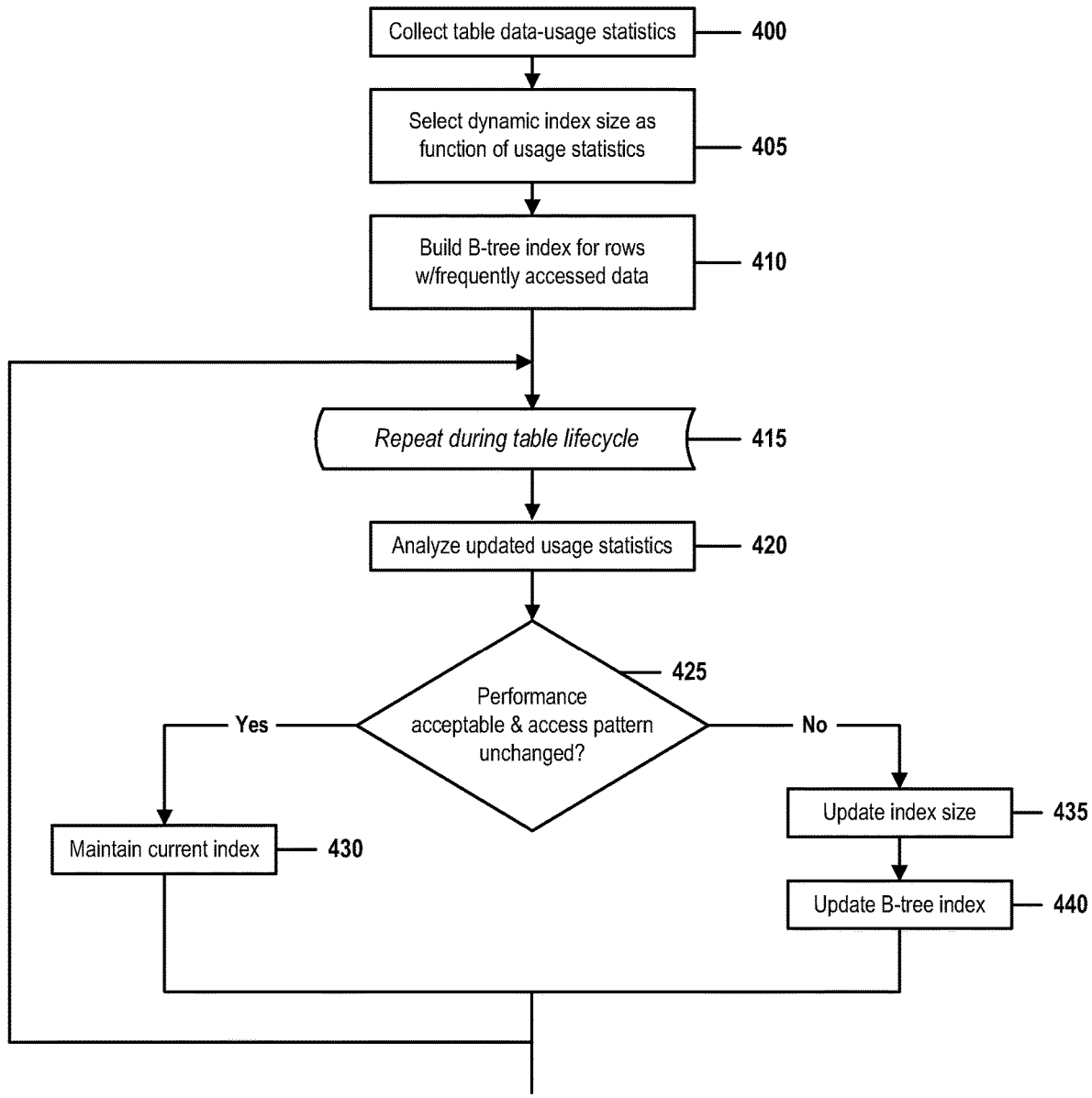
FIG. 4 is a flow chart that illustrates steps of a method for a dynamically self-indexing database-management system in accordance with embodiments of the present invention.

FIG. 4 is a flow chart that illustrates the steps of a method for a dynamically self-indexing database-management system (DBMS) in accordance with embodiments of the present invention.

FIG. 4 shows a method comprising steps 400-440.

In step 400, the DBMS collects data-usage statistics for each table 305 to be configured with a dynamic index. These statistics may have been generated and stored by any means known in the art, such as by means of a transaction-logging module, an SQL-server monitoring tool, a backup or data-recovery utility, or a database-tuning component of the DBMS. In some embodiments, usage statistics may be recorded by a custom application or DBMS component expressly designed for that purpose. In the example of FIG. 3, these statistics are retrieved from a DBMS transaction log 215 maintained by DBMS 300.

In all cases, any usage statistics or other logged data that could be used to personally identify a particular user or a characteristic, behavior, or activity of a particular user are collected, tracked, or analyzed only with the express permission of that user. Express permission can include, for example, an opt-in acknowledgement by the user giving the system permission to access the data in question.

The usage statistics may include any data-usage information deemed relevant to an analysis of the data-access patterns of users of the database. For example, the statistics may identify:
a frequency at which certain columns, or combinations of columns, of certain tables are queried, read, updated, incorporated into a complex query operation like a JOIN operation, or otherwise accessed;
a total number of times, during a specific duration of time, that certain columns, or combinations of columns, of certain tables are queried, read, updated, incorporated into a complex query operation like a JOIN operation, or otherwise accessed;
response times to queries that access certain columns, or combinations of columns, of certain tables of the database.

In one example, the statistics could provide raw data from which may be derived or inferred a relative frequency at which the certain columns or combinations of columns are subject to one or more of the specified types of access, relative to the frequency at which similar operations are performed upon other columns or combinations of the same table or of other tables of the database.

Each row of a first table 305, for example, might contain 10 columns and each row of a second table might contain 25 columns. In this case, the statistics could indicate a frequency at which each combination of one or more columns of the first table and one or more columns of the second table were subject to a JOIN command comprised by a user query. Such statistics might reveal that columns 4 and 3 of the first table and column 9 of the second table are JOINed on average 500 times per day or that columns 1 and 25 of the second table were jointly accessed by various types of queries 22,000 times during the past month.

Relative frequencies or total numbers of such query accesses may then be derived as functions of this raw data. For example, a data-access histogram or a simple tabulation summary may be produced revealing that 95% of all data queries attempted to access only two of the 45 columns of a particular table. From this information, an implementer may infer that it is possible to preserve performance of 95% of all user database queries by retaining only those indexes 310 that specify one of the two columns. Similar inferences may be derived by straightforward means to support implementations that seek to merely reduce a total number of indexes by a threshold percent or that seek to improve performance for a total number of queries serviced during a particular duration of time.

In some embodiments, a table 305 to be indexed may not already exist or may have not been used in production long enough to have generated enough statistics to be deemed statistically meaningful. In such cases, an implementer may arbitrarily select a set of indexes or a percent reduction in the number of each table's dynamic indexes that, according to the implementer's expert knowledge or according to known performance characteristics of prior implementations, is likely to enhance the performance of DBMS 300. This initial selection may be fine-tuned after the database 300 is put into use, either by a manual trial-and-error procedure of iterative adjustment or by means of the repeated statistics-based tuning procedure of steps 425-440.

In step 405, the system or an implementer selects an initial size of each index 310 of each DBMS table 305. As described in step 400, this selection may be performed by any means known in the art, such as by a manual procedure based on an implementer's expert knowledge of a current technology, business goal, or past performance of DBMS 300 or of other DBMS implementations; or by an automated procedure based on an interpretation of the usage statistics. The latter alternative could, for example, comprise an automated analysis of a usage histogram derived in step 400, that identifies an inflection point that partitions columns that are most frequently accessed from those that are only rarely accessed. If data-usage statistics are available, the index-size selection may be made as a function of inferences derived from those statistics.

In some embodiments, if no statistics are available, this initial selection can be made arbitrarily, allowing repeated iterations of steps 415-440 to automatically optimize index size as statistics are accumulated. Some embodiments may also allow a database designer to omit any specification of initial percent size, and automatically and iteratively identify an optimal percent over time as a function of ongoing usage patterns.

The present invention is flexible enough to accommodate embodiments that comprise any sort of manual, automated, or cognitive method known in the art as being capable of selecting this initial index size.

In step 410, the system builds the B-tree indexes 310 for the table columns that satisfy selection criteria of steps 400-405. For example, if an index size is limited to 10% of all possible indexes, the system builds an index 310 for columns of a table that have been more frequently accessed, or that are expected to be more frequently accessed, than 90% of other columns in the same table, or 90% of all columns of all tables of DBMS 300.

Step 415 begins an iterative procedure of steps 415-440 that repeats indefinitely as long as the dynamically self-indexing table remains in use. This procedure is performed once every time that there is a significant update to a table's data-usage statistics stored in transaction log 215.

In some embodiments, a frequency of the performance of steps 415-440 may be set to any value desired by an implementer. For example, a significant update may be interpreted, according to an implementer's preference, as having occurred at a specified frequency, such as once a day, once a week, or once a month. A significant update may also be deemed to occur whenever accumulated transaction information is posted en masse to transaction log 215. Some embodiments may also initiate an iteration of steps 415-440 when a triggering event occurs, such as a major update to the schema of DBMS 300 or receipt of a notification that database performance has degraded.

In step 420, the system retrieves, analyzes, or derives inferences from the updated usage statistics. These analyses and inferences are similar to those derived in steps 400-405. For example, the updated statistics may indicate that a first column of a certain table 305 is no longer being accessed as frequently as it had been during a previous iteration of steps 415-440. The system may conclude from this information that indexes associated with the first column should be eliminated from the set of dynamic indexes 310 because they no longer satisfy a requirement that indexes included in the dynamic set of indexes 310 should reference only those columns that are currently accessed more often than 80% of the columns comprised by any database table 305.

The updated statistics may also identify changes in the performance of database 300. These changes may show changes in the overall performance of the entire database 300, changes in performance when servicing queries directed to a particular table of database 300, or changes in performance when accessing a particular table column, a particular combination of columns, or a particular data item of database 300.

In step 425, the system determines whether the current dynamic indexes are providing desired results. Embodiments may comprise any type of desired results preferred by an implementer, such as a particular level of performance of database 300 or a component of database 300, an amount of required storage that does not exceed a specified threshold, or a requirement that the columns omitted from the dynamically indexed sets of indexes 310 are associated with no more than a specified percent of the total number of queries or that are not queried more frequently than a threshold frequency.

As in all cases where such conditions are evaluated, parameters like a total number of queries or a frequency of query may be evaluated throughout any period of time deemed relevant. A desired result could, for example, consider the relative frequency with which columns are queried during the previous month, during the calendar year, during certain hours of the day or days of the week, during the period of time since an earlier statistics update, during a period of time since a hardware component of FIG. 1 was revised, during a period of time since a component of a schema or sub-schema of DBMS 300 was revised, or throughout a cumulative period that extends back to the first time that statistics were collected.

The system in step 425 also determines whether the update indicates a change in a data-access pattern of DBMS 300, or of one or more tables 305 of DBMS 300. For example, if indexes 310 are intended to comprise indexes to all columns that are accessed on average at least 100 times per hour, it is possible that the update indicates that the current set of indexes 310 now includes indexes that are accessed on average less than 100 times per hour or that omits indexes that are now accessed on average more than 100 times per hour.

Step 430 is performed by the system when the system determines in step 425 that the updated statistics do not indicate any condition that requires a dynamic index 310 to be revised. For example, step 430 might maintain the current dynamic index structure if the updated statistics do not indicate any undesirable performance figures. In another example, step 430 might maintain the current dynamic index structure if the updated statistics do not indicate any changes in usage or query patterns that would require indexes to be added to or removed from the set of dynamic indexes 310 in order to satisfy requirements for including indexes in the dynamic set 310.

At the conclusion of step 430, the system returns to step 415 and repeats the procedure of step 415-440 at the next occurrence of a triggering condition specified in step 415.

Steps 435-440 are performed by the system when the system detects in step 425 a condition that requires a dynamic index 310 to be revised. In some embodiments, if indexes must be added to the sets of dynamic indexes 310, the system may in step 435 revise upwardly a limitation on the physical size of the set of dynamic indexes 310 or on the number of indexes that may be comprised by the sets of dynamic indexes 310. Similarly, the system in step 435 may determine that certain indexes should be added to or removed from the set of dynamic indexes 310 in order to satisfy a requirement described in step 400 or 425, or in FIG. 3.

In all cases, the system in step 435 will automatically self-adjust the size, structure, or list of component indexes of the sets of dynamic indexes 310 in order to ensure that the dynamic indexes 310 still satisfy performance requirements and other requirements after the updated statistics have been analyzed.

In step 440, the system adjusts the B-tree structure of the dynamic indexes to incorporate any revisions necessitated by conditions identified in steps 425 and 435. This adjustment may, for example, include an addition or deletion of an entire index or an addition of a column to or a deletion of a column from an index that identifies a concatenation or other function of multiple columns.

At the conclusion of step 440, the system returns to step 415 and repeats the procedure of step 415-440 at the next occurrence of a triggering condition specified in step 415. During the interim, DBMS 300 continues to continuously manage each index of the sets of indexes 310 in a normal manner, revising values and linkages stored in each index in response to additions, deletions, and revisions of data items in particular rows of the tables 305 of DBMS 300.

In summation, the structures of FIGS. 1-3 and the method of FIG. 4 describe an improved type of DBMS and an improved type of self-indexing database table that automatically optimize indexes to provide the greatest performance for queries that access the most commonly accessed data items. Embodiments of this invention may additionally comprise self-learning or machine-intelligence functions that allow a self-indexing database system to learn over time how to most effectively select and organize sets of dynamic indexes 310 to provide optimal performance.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A dynamically self-indexing database-management system comprising a processor, a memory coupled to the processor, and a computer-readable hardware storage device coupled to the processor, the storage device containing program code configured to be run by the processor via the memory to implement a method for a dynamically self-indexing database-management system, the method comprising:
the database-management system (DBMS) identifying a threshold condition that must be satisfied by an index of a table comprised by a database managed by the DBMS,
where the DBMS accesses data in the table by traversing indexes of a self-modifying table of indexes;
the system deleting all indexes of the database that do not satisfy the threshold condition;
the system reviewing usage statistics that characterize access patterns of data stored in the database;
the system updating the system's selection of indexes as a function of the statistics, such that the updated selection of indexes consists of all indexes that satisfy the threshold condition;
the system identifying a target number of indexes to be included in the self-modifying table, where the target number is identified as a function of stored data-usage statistics of the DBMS; and
the system adjusting the number of indexes included in the self-modifying table, where the adjusting comprises:
restoring a subset of the deleted indexes to the self-modifying table as necessary to ensure that the total number of indexes included in the self-modifying table does not fall below the target number, and
deleting indexes from the self-modifying table as necessary to ensure that the total number of indexes included in the self-modifying table does not exceed the target number.

2. The system of claim 1, further comprising:
the system updating the threshold condition as a function of the statistics.

3. The system of claim 1, further comprising:
the system updating the system's selection of indexes if the database fails to satisfy a predetermined performance requirement.

4. The system of claim 1, where an index satisfies the threshold condition if the index identifies a column of the database that is accessed by no less than a predefined percent of all queries submitted to the database.

5. The system of claim 4, where the predefined percent is updated as a function of the statistics.

6. The system of claim 1, where an index satisfies the threshold condition if the index identifies a column of the database that is accessed with a frequency no less than a predefined frequency during a predefined period of time.

7. The system of claim 1, where the system learns over time, through a cognitive method of machine-intelligence, how to optimize the selection of indexes such that the database provides optimal performance.

8. A method for a dynamically self-indexing database-management system (DBMS), the method comprising:
identifying a threshold condition that must be satisfied by an index of a table comprised by a database managed by the DBMS,
where the DBMS accesses data in the table by traversing indexes of a self-modifying table of indexes;
deleting all indexes of the database that do not satisfy the threshold condition;
reviewing usage statistics that characterize access patterns of data stored in the database;
updating the selection of indexes as a function of the statistics, such that the updated selection of indexes consists of all indexes that satisfy the threshold condition;
identifying a target number of indexes to be included in the self-modifying table, where the target number is identified as a function of stored data-usage statistics of the DBMS; and
adjusting the number of indexes included in the self-modifying table, where the adjusting comprises:
restoring a subset of the deleted indexes to the self-modifying table as necessary to ensure that the total number of indexes included in the self-modifying table does not fall below the target number, and
deleting indexes from the self-modifying table as necessary to ensure that the total number of indexes included in the self-modifying table does not exceed the target number.

9. The method of claim 8, further comprising:
the system updating the threshold condition as a function of the statistics.

10. The method of claim 8, further comprising:
the system updating the system's selection of indexes if the database fails to satisfy a predetermined performance requirement.

11. The method of claim 8, where an index satisfies the threshold condition if the index identifies a column of the database that is accessed by no less than a predefined percent of all queries submitted to the database.

12. The method of claim 8, where an index satisfies the threshold condition if the index identifies a column of the database that is accessed with a frequency no less than a predefined frequency during a predefined period of time.

13. The method of claim 8, where the system learns over time, through a cognitive method of machine-intelligence, how to optimize the selection of indexes such that the database provides optimal performance.

14. The method of claim 8, further comprising providing at least one support service for at least one of creating, integrating, hosting, maintaining, and deploying computer-readable program code in the computer system, wherein the computer-readable program code in combination with the computer system is configured to implement the identifying a threshold condition, the deleting, the reviewing, the updating, the identifying a target number, and the adjusting.

15. A computer program product, comprising a computer-readable hardware storage device having a computer-readable program code stored therein, the program code configured to be executed by a dynamically self-indexing database-management system comprising a processor, a memory coupled to the processor, and a computer-readable hardware storage device coupled to the processor, the storage device containing program code configured to be run by the processor via the memory to implement a method for dynamically self-indexing database management, the method comprising:
the database-management system (DBMS) identifying a threshold condition that must be satisfied by an index of a table comprised by a database managed by the DBMS,
where the DBMS accesses data in the table by traversing indexes of a self-modifying table of indexes;
the system deleting all indexes of the database that do not satisfy the threshold condition;
the system reviewing usage statistics that characterize access patterns of data stored in the database;
the system updating the system's selection of indexes as a function of the statistics, such that the updated selection of indexes consists of all indexes that satisfy the threshold condition;
the system identifying a target number of indexes to be included in the self-modifying table, where the target number is identified as a function of stored data-usage statistics of the DBMS; and
the system adjusting the number of indexes included in the self-modifying table, where the adjusting comprises:
restoring a subset of the deleted indexes to the self-modifying table as necessary to ensure that the total number of indexes included in the self-modifying table does not fall below the target number, and
deleting indexes from the self-modifying table as necessary to ensure that the total number of indexes included in the self-modifying table does not exceed the target number.

16. The computer program product of claim 15, further comprising:
the system updating the threshold condition as a function of the statistics.

17. The computer program product of claim 15, further comprising:
the system updating the system's selection of indexes if the database fails to satisfy a predetermined performance requirement.

18. The computer program product of claim 15, where an index satisfies the threshold condition if the index identifies a column of the database that is accessed by no less than a predefined percent of all queries submitted to the database.

19. The computer program product of claim 15, where an index satisfies the threshold condition if the index identifies a column of the database that is accessed with a frequency no less than a predefined frequency during a predefined period of time.

20. The computer program product of claim 15, where the system learns over time, through a cognitive method of machine-intelligence, how to optimize the selection of indexes such that the database provides optimal performance.

* * * * *